Patented July 2, 1940

2,206,611

UNITED STATES PATENT OFFICE 2,206,611

METHOD OF APPLYING AZO DYESTUFFS TO FIBERS BY DEVELOPMENT UNDER THE EFFECT OF LIGHT

Robert Lantz, Paris, France, assignor of onehalf to Societe Anonyme des Matieres Colorantes & Produits Chimiques de SaintDenis, Paris, France, a company of France No Drawing. Application August 2, 1938, Serial No. 222,714

9 Claims. (Cl. 8—46)

It is known that it is possible to produce insoluble azo-dyestuffs on a fiber by incorporating therein, either by dyeing or by printing, a mixture including the diazosulphonate of an amine, capable of undergoing coupling after diazotization, including no solubilizing groups such as $CO_2H$, $SO_3H$, and a coupling component having a hydroxy group but also free from water-solubilizing groups and adapted to undergo coupling in a position adjacent to the hydroxy group, and developing the colour by the action of light.

The development methods indicated up to the present time for carrying out this process give color intensities which, as a rule, are insufficient for practical purposes. I have found, on the contrary, that it is possible to obtain very intensive shades provided that the sensitive layer is moistened in the course of the development by light. Water may be introduced through any suitable known means. In particular, I may employ the action on the fiber or fabric of an atmosphere at any temperature and containing steam, the fiber or fabric being, in this case, advantageously cooled so as to condense a greater amount of moisture. Or I may have recourse to the action of a cloud of liquid water in the form of very fine particles, produced for instance by an atomizer, a brush machine, etc., or again I may contact the fiber with a damp fabric, forming for instance a kind of lining or supporting layer for the fiber that is being treated.

The development may be carried out by causing light and water to act simultaneously, or by causing them to act alternately, their action being repeated several times.

According to another feature of my invention, in some cases, especially when the source of light produces a considerable amount of infra-red rays, it is advantageous to preclude the drying action of said source of light, which interferes with the moistening treatment, by interposing between said source of light and the sensitive layer a screen transparent to actinic rays but opaque to thermic rays.

I obtained particularly advantageous results by making use for this purpose of a layer of water, either dripping on the stuff or contained in a glass tank or a tank made of any other material which allows the passage of the rays acting for the development.

The method above described can be applied either with the natural light of the sun or with the artificial light of incandescent lamps, carbon arc lamps, lamps utilizing the electric discharge in gases at high or low pressure, and in particular mercury vapor lamps.

I will now give specific examples of the method according to my invention. The following examples concern the application of the method to printing on fabrics. It should be well understood that the method is also applicable without modification to the case in which the mixture which produces the dyestuff has been applied by impregnation, and also to the case of development of colors on fibers which have not been woven into a fabric.

*Example 1.*—The printing is effected upon cotton, mercerised cotton, regenerated cellulose rayon, or natural silk, with the following mixtures:

Red color:

| | Grams |
|---|---|
| Sodium - 2 - methoxy -5-chlorbenzene-diazosulphonate | 32 |
| (2'-hydroxy-3' - naphthoyl) amino-2-methoxy- benzene | 34.3 |
| Sodium sulphoricinate 50% | 50 |
| Soda of 40° Bé | 22 |
| Tragacanth 6% | 700 |
| Diethylene glycol | 50 |
| Water | 111.7 |
| | 1000.0 |

Blue color:

| | Grams |
|---|---|
| Sodium-2.5-dimethoxy- 4 -benzoylaminobenzenediazosulphonate | 20 |
| (2'-hydroxy-3'-naphthoyl) amino 2-methyl-benzene | 13.3 |
| Sodium sulphoricinate 50% | 30 |
| Soda of 40° Bé | 15 |
| Tragacanth 6% | 700 |
| Diethylene glycol | 50 |
| Water | 171.7 |
| | 1000.0 |

Scarlet color:

| | Grams |
|---|---|
| Sodium-2-methyl-5 - chlorbenzene diazosulphonate | 33.5 |
| (2 - hydroxy - 3'-naphthoyl) amino-2-methoxy-benzene | 31.5 |
| Sodium sulphoricinate 50% | 50 |
| Soda of 40° Bé | 27.5 |
| Tragacanth 6% | 700 |
| Diethylene glycol | 25 |
| Water | 132.5 |
| | 1000.0 |

The fibers are exposed to the action of light for 4 minutes at a distance of 15 centimeters from a carbon arc lamp of 11 amperes under 110 volts, behind a glass tank through which a water stream is flowing, the following precautions being further taken:

In a first case, fabrics printed with blue and red colors are exposed:

a. Either in an atmosphere of saturated steam at a temperature ranging from 40 to 70° C.

b. Or in the same atmosphere on a metal box through which flows a water stream the temperature of which is respectively 24, 37, 50° C. for a temperature of the atmosphere of 40, 50 and 60° C.

c. Or again the printed fabric is carried by a thick cotton fabric impregnated with water.

*Example 2.*—Cotton fabrics printed with the second or third mixture mentioned in Example 1 for the production of blue or scarlet colors are exposed in an atmosphere of saturating steam at a temperature ranging from 70 to 100° C.

The method according to my invention permits of obtaining, on fibers, color intensities considerably more intensive than those obtained with the same fabrics treated without moistening in the course of the development even when a previous wetting has been effected.

The method is not limited to the use of the amines and coupling components above described. For instance, very good results can be obtained by substituting for the 34.3 g. of (2'-hydroxy-3'-naphthoyl)-amino-2-methoxy-benzene as used in Example 1 for the production of a red color, 25 g. of 4.4'-bis-acetylacetamino-3.3'-dimethyl-diphenyl, thereby producing a yellow shade, or 16.8 g. of beta naphthol thereby producing a scarlet shade.

In a general manner, while I have, in the above description, disclosed what I deem to be practical and efficient embodiments of my invention, it should be well understood that I do not wish to be limited thereto as there might be changes made therein without departing from the principle of my invention as comprehended within the scope of the appended claims.

What I claim is:

1. In the production of water insoluble azo-dyestuffs on fiber from a light-sensitive mixture applied to said fiber and including the diazosulphonate of an amine free from water-solubilizing group, capable of coupling in diazotized form, together with a coupling component also free from water-solubilizing group but having an hydroxy group and being capable of coupling in ortho position with respect to said hydroxy group, the step which comprises concurrently moistening the fiber impregnated with said mixture and exposing the same to the action of actinic light.

2. In the production of water insoluble azo-dyestuffs on fiber from a light-sensitive mixture applied to said fiber and including the diazosulphonate of an amine free from water-solubilizing group, capable of coupling in diazotized form, together with a coupling component also free from water-solubilizing group but having an hydroxy group and being capable of coupling in ortho position with respect to said hydroxy group, the step which comprises keeping the fiber impregnated with said mixture in a moist atmosphere while simultaneously exposing the said fiber to the action of actinic light.

3. In the production of water insoluble azo-dyestuffs on fiber from a light-sensitive mixture applied to said fiber and including the diazosulphonate of an amine free from water-solubilizing group, capable of coupling in diazotized form, together with a coupling component also free from water-solubilizing group having an hydroxy group and being capable of coupling in ortho position with respect to said hydroxy group, the step which comprises concurrently moistening the fiber impregnated with said mixture and exposing the same to the action of actinic radiation containing light under means, transparent to actinic radiations, for filtering out calorific radiations.

4. In the production of water insoluble azo-dyestuffs on fiber from a light-sensitive mixture applied to said fiber and including the diazosulphonate of an amine free from water-solubilizing group, capable of coupling in diazotized form, together with a coupling component also free from water-solubilizing group but having an hydroxy group and being capable of coupling in ortho position with respect to said hydroxy group, the step which comprises simultaneously contacting the fiber impregnated with said mixture, with a cloud of fine water particles and exposing the same to the action of actinic light.

5. In the production of water insoluble azo-dyestuffs on fiber from a light-sensitive mixture applied to said fiber and including the diazosulphonate of an amine free from water-solubilizing group, capable of coupling in diazotized form, together with a coupling component also free from water-solubilizing group but having an hydroxy group and being capable of coupling in ortho position with respect to said hydroxy group, the step which comprises exposing to action of actinic light the fiber impregnated with the said mixture, in a zone containing saturating steam at a temperature from 40 to 100° C.

6. In the production of water insoluble azo-dyestuffs on fiber from a light-sensitive mixture applied to said fiber and including the diazosulphonate of an amine free from water-solubilizing group, capable of coupling in diazotized form, together with a coupling component also free from water-solubilizing group but having an hydroxy group and being capable of coupling in ortho position with respect to said hydroxy group, the step which comprises exposing to the action of actinic light the fiber impregnated with the said mixture, in a zone containing saturating steam at a temperature of at least 40° C. but below 100° C., while simultaneously cooling the said fiber at a temperature lower than that of said steam, to promote water condensation on said fiber.

7. In the production of water insoluble azo-dyestuffs on fiber from a light-sensitive mixture applied to said fiber and including the diazosulphonate of an amine free from water-solubilizing group, capable of coupling in diazotized form, together with a coupling component also free from water-solubilizing group but having an hydroxy group and being capable of coupling in ortho position with respect to said hydroxy group, the step which comprises concurrently moistening the fiber impregnated with said mixture and exposing the same to the action of actinic radiation containing light under a water screen.

8. In the production of water insoluble azo-dyestuffs on fiber from a light-sensitive mixture applied to said fiber and including the diazosulphonate of an amine free from water-solubilizing group, capable of coupling in diazotized form, together with a coupling component also free from water-solubilizing group but having an hydroxy group and being capable of coupling in ortho position with respect to said hydroxy group, the step which comprises concurrently moistening the fiber impregnated with said mixture and exposing the same to the action of light from a carbon arc lamp behind a water screen.

9. In the production of water insoluble azo-dyestuffs on fiber from a light-sensitive mixture applied to said fiber and including the diazosulphonate of an amine free from water-solubilizing group, capable of coupling in diazotized form, together with a coupling component also free from water-solubilizing group but having an hydroxy group and being capable of coupling in ortho position with respect to said hydroxy group, the step which comprises exposing the fiber impregnated with said mixture to the action of light from a carbon arc lamp behind a water screen, in a zone containing saturating steam at a temperature of about 100° C.

ROBERT LANTZ.